United States Patent [19]

Pollock

[11] 4,130,129
[45] Dec. 19, 1978

[54] PLUG VALVE

[76] Inventor: Jack H. Pollock, 1428 W. 132nd St., Gardena, Calif. 90249

[21] Appl. No.: 853,112

[22] Filed: Nov. 21, 1977

[51] Int. Cl.² ............................................. F16K 35/00
[52] U.S. Cl. ................................... 137/385; 251/161; 251/175; 251/188; 251/192
[58] Field of Search ................ 137/385; 251/161, 175, 251/188, 192

[56] References Cited

U.S. PATENT DOCUMENTS

| | | | |
|---|---|---|---|
| 1,857,321 | 5/1932 | Nemec | 137/385 |
| 2,299,341 | 10/1942 | Ohls | 251/161 |
| 2,567,032 | 9/1951 | Schmidt | 251/175 X |
| 2,996,083 | 8/1961 | Huska | 251/175 X |

*Primary Examiner*—Harold W. Weakley

*Attorney, Agent, or Firm*—Robert Louis Finkel

[57] ABSTRACT

A plug valve, especially for use in lines carrying abrasive materials and materials at high temperatures and pressures. The valve body is rotatable in a valve casing having inlet and outlet ducts to bring a port in the valve body into communication with the inlet and outlet ducts. Recesses are provided in the valve body wall for closely fitted sealing plugs. The outer faces of these plugs conform to the wall of the valve body. A fluid reservoir within the valve body is connected to the recesses by passageways. A moveable piston is provided in the reservoir to force hydraulic fluid under controllable pressure into the spaces between the rear wall of the recesses and the sealing plugs, thereby permitting the sealing plugs to be maintained in fluid-tight contact with the inner wall of the casing.

9 Claims, 7 Drawing Figures

PLUG VALVE

BACKGROUND OF THE INVENTION

1. Field of the Invention

This invention relates to valves for controlling the flow of fluid through a line, and more particularly to valves of the plug type in which inlet and outlet ducts in a valve casing are brought into fluid communication through a port formed in a valve body by rotating the valve body within the casing. Still more particularly it deals with improved means in such valves for adjustably maintaining a fluid-tight seal between the valve body and the inlet and outlet ducts.

2. Prior Art

Fluid valves of the rotary plug-type are well known. The principal problem posed by such valves is the need to maintain a fluid-tight seal between the rotating valve body or plug and the inlet or outlet ducts in the casing wall.

Failure to effectively seal these ducts, and especially the inlet duct, not only prevents the valve from controlling the flow of fluid through the line, but in addition leads to errosion and, if not remedied, eventual destruction of the plug, scoring of the inner wall of the casing, damage to the plug bearing, and fluid leakage.

A variety of means have been devised to overcome this problem. Generally these depend on conventional fluid retaining devices such as rings, packing glands, deformable plugs, and the like. While some of these may be temporarily effective, they are subject to wear, physical and chemical deterioration and fatique, particularly when the fluid with which they are used is abrasive, chemically reactive or extremely hot or cold. Because proper sealing depends on the maintenance of close tolerances between the plug or its seals and the casing wall, the useful life of these prior art valves is more or less limited.

The principal object of the subject invention is to provide a plug valve having sealing means which afford optimal flow control under all operating conditions, and which can be adjusted to compensate for changes in those conditions and for unavoidable wear and deterioration of the valve components.

Another object is the provision of such a valve in which the sealing means can be adjusted while the device is in operation.

Still another object is the provision of a plug valve of this type which requires a minimum of maintenance and which can be maintained and repaired quickly and easily when necessary.

Other objects and advantages of the invention will become apparent from the description which follows.

SUMMARY OF THE INVENTION

As do conventional plug valves, the subject invention comprises a thick-walled casing and a valve body. The fittings on the valve casing allow it to be inserted in a pipeline and secured to the adjacent pipe ends. Fluid-tight passages, referred to here for convenience as inlet and outlet ducts, carry fluid through the casing. The valve body, rotatable in the casing, is positioned in the flow path between the inlet and outlet ducts to interrupt the flow of fluid. A port formed in the valve body is brought into alignment with the ducts, permitting fluid to flow through the valve, by rotating the valve body.

The novelty of the invention resides in the provision of sealing plugs in the wall of the valve body which are moveable radially outwardly under controlled force to insure a fluid-tight seal between the valve body and the inlet and outlet ducts.

These sealing plugs are fitted into recesses formed in the wall of the valve body in registry with the inlet and outlet ducts. The outer faces of the plugs conform to the wall of the valve body. A fluid reservoir formed in the valve body is connected to the recesses and filled with hydraulic fluid. A moveable piston in the reservoir allows hydraulic fluid to be forced under controlled pressure into the spaces between the rear walls of the sealing plugs and their respective recesses, thereby forcing the plugs into tight contact with the inner wall of the casing and the mouths of the inlet and outlet ducts.

The structure and operation of the invention will be more fully understood upon consideration of the following detailed description of the preferred embodiment as illustrated in the accompanying drawings in which:

THE DRAWINGS

Wherever practicable a single numeral is used for the same or functionally similar features in the several figures.

DETAILED DESCRIPTION

Figure 1:
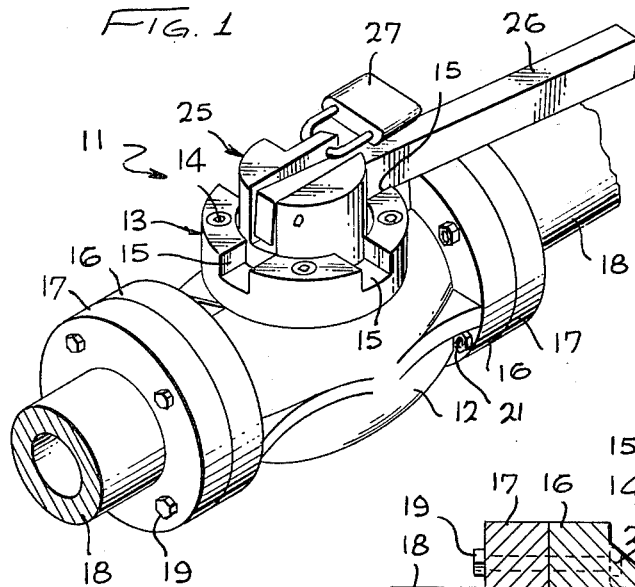
FIG. 1 is a perspective view of a typical valve embodying the subject invention in place in a pipeline.

Referring to FIG. 1, a preferred embodiment of a valve 11 incorporating the subject invention is contained in a sturdy hollow casing 12 of cast iron, bronze or any other suitable material. For convenience, the casing 11 is constructed with a removeable cover plate 13 which is secured to the main casing body by means of bolts 14. The annular cover plate 13 is provided with slots 15 the purpose of which will be explained shortly.

Casing 12 is formed with opposed extensions terminating in mounting flanges 16 adapted to mate with the flanges 17 on the ends of adjacent sections of pipe 18. The valve 11 is secured in place in the pipeline by means of bolts 19 and nuts 21.

A plug or valve body 25 is held in place in casing 11 by cover plate 13. The upper end of valve body 25 protrudes through cover plate 13 and is slotted to receive valve handle 26. Handle 26 is pivotably attached to valve body 25 and is sized to fit snugly into slots 15 in the cover plate 13. Locking means, such as padlock 27, retain the handle 26 in slots 15 and protect the valve 11 against tampering.

Figure 2:
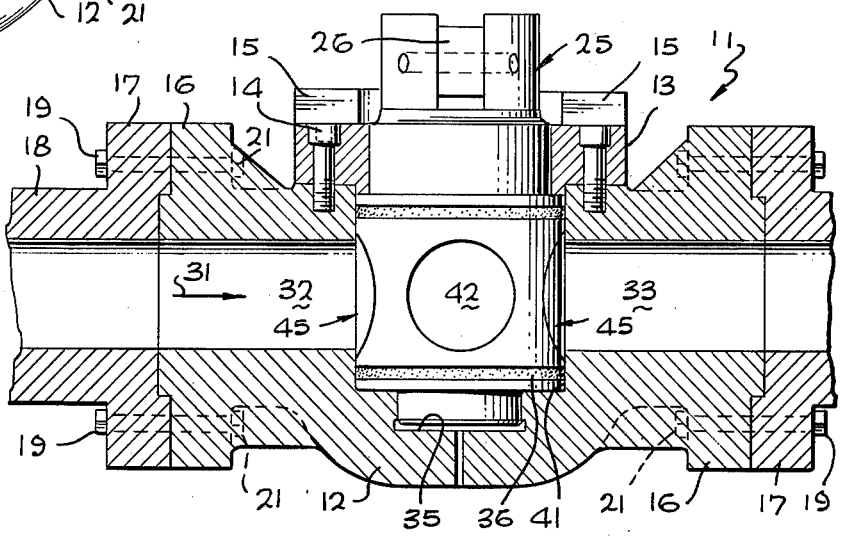
FIG. 2 is a side elevation of the valve of FIG. 1 with portions cut away to show its internal construction.

Referring to FIG. 2, casing 12 is formed with internal passageways communicating with pipe sections 18. For descriptive purposes, the flow of fluid through the pipeline is assumed to be in the direction indicated by the arrow 31, and the passageways in casing 12 are designated "inlet duct" 32 and "outlet duct" 33, respectively. It will be understood that these terms are applied in a relative sense only, and are interchangeable insofar as the construction and operation of the valve 11 are concerned.

Internally, casing 12 is formed with a recess 35 in its floor. This recess 35 serves as a bearing for the lower end of valve body 25 and may be provided with a bushing or other conventional mounting which permits the valve body 25 to rotate easily within the casing 12.

Valve body 25 is of generally cylindrical shape and is sized to fit snugly in the hollow center of casing 12. The surface of valve body 25 is in fluid-tight contact with the inner wall 41 of casing 12 and in sealing abutment with the adjacent ends of inlet duct 32 and outlet duct 33. Conventional sealing means, such as rings 36 in grooves 37, are provided to insure against leakage.

Figure 3:
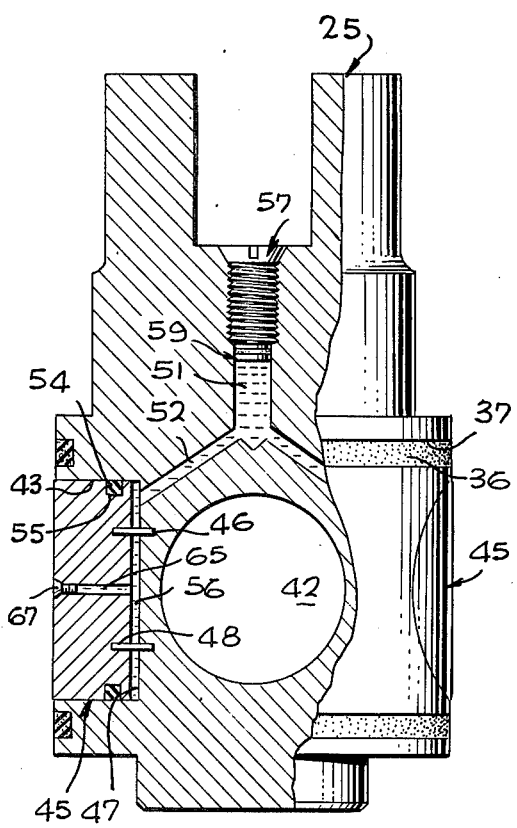
FIG. 3 is an enlarged side elevational view of the valve body of the valve of FIG. 2 with portions cut away to show its internal construction.
Figure 4:
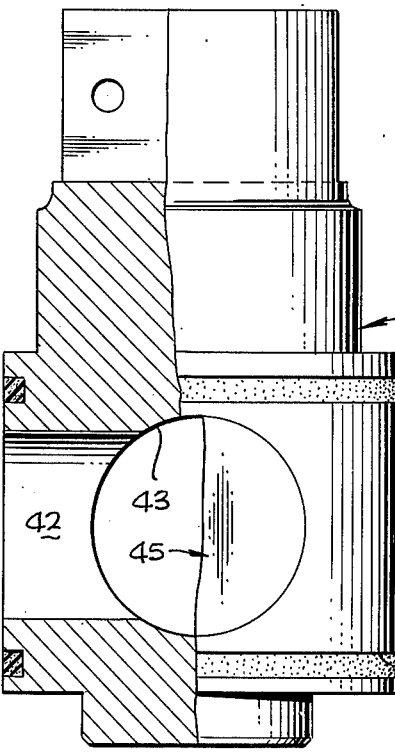
FIG. 4 is an elevational view of the valve body of FIG. 3 taken in the direction 4—4 with portions cut away to show its internal construction.

As shown most clearly in FIGS. 3 and 4, valve body 25 contains a port 42 of the same diameter as inlet and outlet ducts 32, 33 and in registry with them. Additionally, two generally cyndrical recesses 43 are formed in the wall of valve body 25 in registry with the ducts 32, 33. The diameter of these recesses 43 is greater than that of ducts 32, 33, and is preferably as great as strength of the material of which the valve body 25 is constructed and the need to maintain the structural integrity of the valve body 25 will permit.

Figure 5:
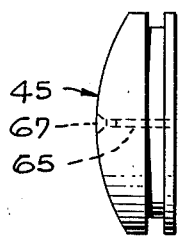
FIG. 5 is a top plan view of a typical sealing plug.
Figure 6:
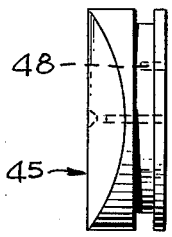
FIG. 6 is a side elevational view of the sealing plug of FIG. 5.

A pair of sealing plugs 45 as shown in FIGS. 5 and 6 are sized to fit snugly in recesses 43. Preferably, the plugs 45 are of a hardened alloy having a low coefficient of thermal expansion, faced with a carbide (carbaloy) or other metallic or similarly suitable material having a high resistivity to the temperature and abrasive character of the fluid passing through the pipeline.

The faces of plugs 45 conform closely with the adjacent surface of valve body 25 and the inner wall 41 of casing 12. Locating plugs 46 in the rear wall 47 of recesses 43 and corresponding pin holes 48 in the backs of plugs 45, or other conventional positioning means, prevent plugs 45 from rotating in recesses 43 while allowing them to move freely radially inwardly and outwardly of valve body 25.

A fluid reservoir 51 is formed in valve body 25 and is connected to recesses 43 by means of internal passageways 52 terminating in the rear wall 47 of recesses 43. Sealing plugs 45 are provided with Stelite or similar high-strength rings or seals 54, seated in annular grooves 55, which define a fluid-tight chamber 56 between the plugs 45 and the inner ends of recesses 43.

Figure 7:
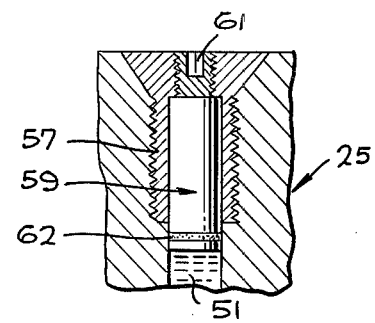
FIG. 7 is an enlarged side elevational view of the hydraulic piston and piston control mechanism of the valve body of FIG. 3 with portions cut away to show its internal construction.

As best seen in FIG. 7, a hollow screw 57 set in the slotted top of valve body 25 contains a piston 59 extending into reservoir 51. A fine-pitch Allen-type set screw 61 in the top of screw 57 controls the depth of extension of piston 59 into reservoir 51. A sealing ring 62 on piston 59 provides a fluid-tight seal with the walls of reservoir 51.

Before assembling the valve 11, the sealing plugs 45 are inserted into recesses 43 of valve body 25 and positioned by means of locating pins 46 and pin holes 48. Screw 57 and piston 59 are removed and reservoir 51, passageways 52 and chambers 56 are charged with a suitable hydraulic fluid. Plugs 45 are provided with air/fluid pressure bleed ducts 65 capped with recessed screw plugs 67. With plugs 67 removed, and set-screw 61 retracted, piston 59 is inserted into reservoir 51 and secured by means of screw 57. As screw 57 is advanced, the air trapped in chamber 56 is forced out through ducts 65 by the hydraulic fluid. When all of the air has been purged and screw 57 fully seated, plugs 67 are inserted and valve body 25, with plugs 45 in place, is slipped into casing 12 and seated in bearing 35. Cover plate 13 is passed over handle 26 and valve body 25 and bolted in place. Set screw 61 is then tightened against piston 59, thrusting it more deeply into reservoir 51 and thereby forcing sealing plugs 45 outwardly of recesses 43 and into contact with the inner wall 41 of casing 12 with as much force as desired. Should greater sealing force be required, or should the plugs 45 become worn through use, further advancing set-screw 61 permits the necessary adjustment to be made quickly and conveniently, without disassembling the valve 11, even while fluid is flowing through the line.

In operation, as with conventional plug valves when the valve body 25 is oriented as shown in FIG. 1, the flow of fluid through line 18 is unimpeded. Removing lock 27 allows handle 26 to be raised clear of slot 15 and used to rotate body 25 90°, into the position shown in FIG. 2, wherein plugs 45 effectively seal inlet and outlet ducts 32, 33.

It should be understood that the structure and mode of operation illustrated are not intended to limit the scope of the invention as claimed. By way of example, it will be noted that although the valve shown and described here services a single pipeline, the subject invention readily may be adapted to control the flow of fluid in a plurality of independent lines, between several converging lines and a single outlet, between a single incoming line and a plurality of outlets, or in any other combination. Similarly, while the piston driving arrangement illustrated in FIG. 7 is presently preferred, the invention contemplates the use of any number of other hydraulic drive means as well.

What I claim as my invention is:

1. A rotary plug valve comprising:
   a casing having inlet and outlet ducts therein;
   a valve body rotatable in said casing in fluid-tight abutment with said ducts and having a port therethrough conformed to communicate between said ducts;
   recesses in said valve body in registry with said ducts;
   sealing plugs removeably seated in and sealing said recesses and defining fluid-tight chambers between said plugs and said recesses;
   a fluid reservoir within said valve body containing an hydraulic fluid;
   fluid passageways communicating between said reservoir and said fluid chambers;
   a piston in said valve body operatively connected to said reservoir for applying controlled pressure to the hydraulic fluid in said reservoir; and
   drive means in the valve body controllably moving said piston against said hydraulic fluid and thereby urging said sealing plugs into intimate abutment with said inlet and outlet ducts.

2. A rotary plug valve as defined by claim 1, comprising:
   a removable cover plate on said casing surrounding said valve body and retaining said valve body in said casing;
   handle means connected to said valve body for rotating said valve body in said casing; and
   detent means associated with said cover plate, releasably securing said handle means against rotation.

3. A rotary plug valve as defined by claim 2, wherein:

said detent means include a plurality of slots in said cover plate extending radially of said valve body; and said handle means include an elongated handle hingedly connected to said valve body for movement into releasable engagement with said slots.

4. A rotary plug valve as defined by claim 1, comprising:

exposed faces on said sealing plugs conforming with said inlet and outlet ducts;

position locating means associated with said recesses and said sealing plugs for cooperatively positioning said sealing plugs in said recesses with said faces in conformity with said inlet and outlet ducts; and sealing means associated with said sealing plugs for maintaining a fluid-tight seal between said sealing plugs and said recesses.

5. A rotary plug valve as defined by claim 4, wherein:

said position locating means include a plurality of locating pins in said recesses and a plurality of pin receiving depressions in the adjacent faces of said sealing plugs.

6. A rotary plug valve as defined by claim 4, comprising:

a hollow receiver for said piston removably inserted into said plug valve adjacent to and in communication with said reservoir;

a set-screw threaded through the end of said receiver and positioned to engage the adjacent end of said piston within said receiver; and sealing means associated with said piston for maintaining a fluid-tight seal between said piston and said reservoir.

7. A rotary plug valve as defined by claim 4, comprising:

a pressure bleed duct in said sealing plugs in communication with said fluid-tight chambers; and a pressure relief plug in said pressure bleed duct for bringing said pressure bleed duct into communication with the ambient atmosphere.

8. In a rotary plug valve including a casing having inlet and outlet ducts therein, a valve body rotatable in said casing in fluid-tight abutment with said inlet and outlet ducts, said valve body comprising:

a port through said valve body conformed for communication with said inlet and outlet ducts;

recesses formed in said valve body in registry with said inlet and outlet ducts;

sealing plugs having exposes faces conforming with said inlet and outlet ducts removably seated in and sealing said recesses, and defining fluid-tight chambers between said sealing plugs and said recesses;

a fluid reservoir within said valve body containing an hydraulic fluid;

fluid passageways in said valve body communicating between said reservoir and said fluid chambers;

a piston in said valve body operatively connected to said reservoir for applying controlled pressure to the hydraulic fluid in said reservoir; and drive means in the valve body controllably moving said piston against said hydraulic fluid and thereby urging said sealing plugs into intimate abutment with said inlet and outlet ducts.

9. A rotatable valve body for rotary plug valves as defined by claim 8, comprising:

a handle connected to said valve body for rotating said valve body in said casing, adapted to releasably engage said casing and thereby secure said valve body against rotation;

positioning means associated with said recesses for positioning said sealing plugs in said recesses with said exposed faces thereof in conformity with said inlet and outlet ducts;

a pressure bleed duct in said sealing plugs in communication with said fluid-tight chambers; and a pressure relief plug in said pressure bleed duct for bringing said pressure bleed duct into communication with the ambient atmosphere.

* * * * *